United States Patent
Qiao et al.

(10) Patent No.: US 12,438,644 B2
(45) Date of Patent: Oct. 7, 2025

(54) COMMUNICATION METHOD AND APPARATUS

(71) Applicant: HUAWEI TECHNOLOGIES CO., LTD., Guangdong (CN)

(72) Inventors: Yunfei Qiao, Hangzhou (CN); Ying Chen, Hangzhou (CN); Xiaolu Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 390 days.

(21) Appl. No.: 18/063,315

(22) Filed: Dec. 8, 2022

(65) Prior Publication Data
US 2023/0163890 A1 May 25, 2023

Related U.S. Application Data

(63) Continuation of application No. PCT/CN2021/098829, filed on Jun. 8, 2021.

(30) Foreign Application Priority Data

Jun. 9, 2020 (CN) .......................... 202010517555.9

(51) Int. Cl.
*H04L 1/1812* (2023.01)
*H04W 72/12* (2023.01)
*H04W 72/23* (2023.01)

(52) U.S. Cl.
CPC .......... *H04L 1/1812* (2013.01); *H04W 72/12* (2013.01); *H04W 72/23* (2023.01)

(58) Field of Classification Search
CPC ... H04L 1/1812; H04L 1/1896; H04L 1/1822; H04L 1/1825; H04W 24/02; H04W 72/12; H04W 72/23
(Continued)

(56) References Cited

U.S. PATENT DOCUMENTS

2009/0300456 A1* 12/2009 Pelletier ................ H04L 5/0005
714/748
2012/0176884 A1* 7/2012 Zhang .................... H04B 7/024
370/329
(Continued)

FOREIGN PATENT DOCUMENTS

| CN | 103873213 A | 6/2014 |
| WO | 2020010493 A1 | 1/2020 |
| WO | 2020098685 A1 | 5/2020 |

OTHER PUBLICATIONS

3GPP TS 38.212 V16.1.0, "3rd Generation Partnership Project; Technical Specification Group Radio Access Network; NR; Multiplexing and channel coding (Release 16)," Mar. 2020, 141 pages.
(Continued)

*Primary Examiner* — Rownak Islam
(74) *Attorney, Agent, or Firm* — Fish & Richardson P.C.

(57) ABSTRACT

Embodiments of this application provide communication methods and apparatuses. One method includes: receiving first indication information from a network device, where the first indication information indicates a first part of a Hybrid Automatic Repeat reQuest (HARQ) process identifier scheduled by the network device, obtaining a second part of the HARQ process identifier, and determining the HARQ process identifier based on the first part of the HARQ process identifier and the second part of the HARQ process identifier.

17 Claims, 5 Drawing Sheets

(58) Field of Classification Search
USPC .......................................................... 370/329
See application file for complete search history.

(56) References Cited

U.S. PATENT DOCUMENTS

2018/0014298 A1*  1/2018  Sun ....................... H04W 72/21
2021/0226742 A1*  7/2021  Wu ....................... H04L 5/0098

OTHER PUBLICATIONS

3GPP TS 38.213 V16.1.0, "3rd Generation Partnership Project; Technical Specification Group Radio Access Network; NR; Physical layer procedures for control (Release 16)," Mar. 2020, 156 pages.
3GPP TS 38.214 V16.1.0, "3rd Generation Partnership Project; Technical Specification Group Radio Access Network; NR; Physical layer procedures for data (Release 16)," Mar. 2020, 151 pages.
International Search Report and Written Opinion in International Appln. No. PCT/CN2021/098829, mailed on Aug. 26, 2021, 15 pages (with English translation).
Extended European Search Report in European Appln No. 21821821.2, dated Sep. 29, 2023, 8 pages.

* cited by examiner

COMMUNICATION METHOD AND APPARATUS

CROSS-REFERENCE TO RELATED APPLICATIONS

This application is a continuation of International Application No. PCT/CN2021/098829, filed on Jun. 8, 2021, which claims priority to Chinese Patent Application No. 202010517555.9, filed on Jun. 9, 2020. The disclosures of the aforementioned applications are hereby incorporated by reference in their entireties.

TECHNICAL FIELD

Embodiments of this application relate to the field of information technologies, and in particular, to a communication method and apparatus.

BACKGROUND

In the field of communication systems, to ensure reliability of data transmission, a hybrid automatic repeat request (HARQ) technology is usually used in a cellular network. The HARQ technology is a technology that combines forward error correction (FEC) and automatic repeat-request (ARQ). According to FEC, redundancy information is added, so that a terminal device can correct some errors, thereby reducing a quantity of retransmission times. For an error that cannot be corrected through FEC, the terminal device requests a network device to resend data based on an ARQ mechanism. In the HARQ technology, to improve throughput, the network device initiates a plurality of HARQ processes to the terminal device in parallel.

In an existing communication network, an HARQ process is usually indicated by a field HARQ process number in downlink control information (DCI). The field HARQ process number can include information of a maximum of four bits to separately indicate a process identifier of four bits in HARQ. Consequently, a maximum quantity of HARQ processes that can be supported in an existing standard is 16.

However, in a satellite communication network, a quantity of HARQ processes that a network device needs to initiate to a terminal device in parallel is often greater than 16, and an indication range of the HARQ process is excessively small.

SUMMARY

Embodiments of this application provide a communication method and apparatus, to resolve a technical problem in the conventional technology that an indication range of an HARQ process is excessively small.

According to a first aspect, an embodiment of this application provides a communication method. The method may be applied to a communication apparatus, or may be applied to a chip in a communication apparatus. The communication apparatus may be, for example, a terminal device. The following describes the method with an example in which the method is applied to a terminal device. In the method, the terminal device receives first indication information from a network device, where the first indication information is used to indicate a first part of an HARQ process identifier scheduled by the network device. Then, the terminal device obtains a second part of the HARQ process identifier, and determines the HARQ process identifier based on the first part of the HARQ process identifier and the second part of the HARQ process identifier.

By using the communication method provided in the first aspect, the HARQ process identifier is split into the first part and the second part for separate indication. In this way, an indication range of an HARQ process is extended without modifying a DCI format.

In an implementable manner, the first indication information is carried in downlink control information DCI, an uplink message of a BWP, or a downlink message of a BWP.

In an implementable manner, that the terminal device obtains a second part of the HARQ process identifier may include: The terminal device first obtains a demodulation reference signal DMRS of a physical downlink control channel PDCCH, and then determines the second part of the HARQ process identifier based on an initial value of the DMRS.

By using the communication method provided in this implementable manner, some bits of the HARQ process identifier may be implicitly carried in the demodulation reference signal of the PDCCH, thereby extending an indication range of the HARQ process identifier.

In an implementable manner, that the terminal device obtains a second part of the HARQ process identifier may include: The terminal device first determines a target BWP of the terminal device based on a mapping relationship between the first part of the HARQ process identifier and the BWP. Then, the terminal device obtains the second part of the HARQ process identifier on the target BWP.

By using the communication method provided in this implementable manner, a mapping relationship between the BWP and the HARQ process is established, thereby extending an indication range of the HARQ process identifier.

In an implementable manner, the mapping relationship between the BWP and the second part of the HARQ process identifier is configured by using radio resource control RRC signaling.

In an implementable manner, that the terminal device obtains a second part of the HARQ process identifier may include: The terminal device first obtains time domain information corresponding to the first indication information. Then, the terminal device determines the second part of the HARQ process identifier based on the time domain information and a mapping relationship between the time domain information and the second part of the HARQ process identifier.

By using the communication method provided in this implementable manner, a related bit of the HARQ process identifier may be implicitly carried in the time domain information, thereby extending an indication range of the HARQ process identifier.

In an implementable manner, the time domain information is a slot index in a radio frame corresponding to the first indication information.

In an implementable manner, the first indication information is carried in the DCI.

In an implementable manner, the HARQ process identifier includes bitmap information.

In an implementable manner, the bitmap information is greater than four bits.

According to a second aspect, an embodiment of this application provides a communication method. The method may be applied to a communication apparatus, or may be applied to a chip in a communication apparatus. The communication apparatus may be, for example, a network device. The following describes the method with an example in which the method is applied to a network device. In the method, the network device sends first indication information to a terminal device, where the first indication information is used to indicate a first part of an HARQ process identifier scheduled by the network device, and the first part of the HARQ process identifier is used to cooperate with a second part of the HARQ process identifier to determine the HARQ process identifier.

In an implementable manner, the first indication information is carried in downlink control information DCI, an uplink message of a bandwidth part BWP, or a downlink message of a BWP.

In an implementable manner, after sending first indication information to a terminal device, the method further includes:

sending the second part of the HARQ process identifier to the terminal device on a target BWP.

In an implementable manner, second indication information is carried in downlink control information DCI, an uplink message of a BWP, or a downlink message of a BWP.

In an implementable manner, the HARQ process identifier includes bitmap information.

In an implementable manner, the bitmap information is greater than four bits.

According to a third aspect, an embodiment of this application provides a communication apparatus. The communication apparatus includes:

a receiving module, configured to receive first indication information from a network device, where the first indication information is used to indicate a first part of an HARQ process identifier scheduled by the network device; and a processing module, configured to: obtain a second part of the HARQ process identifier; and determine the HARQ process identifier based on the first part of the HARQ process identifier and the second part of the HARQ process identifier.

In an implementable manner, the first indication information is carried in downlink control information DCI, an uplink message of a bandwidth part BWP, or a downlink message of a BWP.

In an implementable manner, the processing module is specifically configured to: obtain a demodulation reference signal DMRS of a physical downlink control channel PDCCH; and determine the second part of the HARQ process identifier based on an initial value of the DMRS.

In an implementable manner, the processing module is specifically configured to: determine a target BWP of a terminal device based on a mapping relationship between the first part of the HARQ process identifier and the BWP; and obtain the second part of the HARQ process identifier on the target BWP.

In an implementable manner, the mapping relationship between the first part of the HARQ process identifier and the BWP is configured by using radio resource control RRC signaling.

In an implementable manner, the processing module is specifically configured to: obtain time domain information corresponding to the first indication information; and determine the second part of the HARQ process identifier based on the time domain information and a mapping relationship between the time domain information and the second part of the HARQ process identifier.

In an implementable manner, the time domain information is a slot index in a radio frame corresponding to the first indication information.

In an implementable manner, the HARQ process identifier includes bitmap information.

In an implementable manner, the bitmap information is greater than four bits.

According to a fourth aspect, an embodiment of this application provides a communication apparatus. The communication apparatus includes:

a storage module, configured to store an executable program; and a sending module, configured to send first indication information to a terminal device, where the first indication information is used to indicate a first part of an HARQ process identifier scheduled by a network device, and the first part of the HARQ process identifier is used to cooperate with a second part of the HARQ process identifier to determine the HARQ process identifier.

In an implementable manner, the first indication information is carried in downlink control information DCI, an uplink message of a bandwidth part BWP, or a downlink message of a BWP.

In an implementable manner, the sending module is further configured to send the second part of the HARQ process identifier to the terminal device on a target BWP.

In an implementable manner, the HARQ process identifier includes bitmap information.

In an implementable manner, the bitmap information is greater than four bits.

According to a fifth aspect, an embodiment of this application provides a terminal device. The terminal device includes a processor, a memory, a transmitter, and a receiver, where the transmitter and the receiver are coupled to the processor, the processor controls a sending action of the transmitter, and the processor controls a receiving action of the receiver.

The memory is configured to store computer-executable program code. The program code includes information. When the processor executes the information, the information enables the terminal device to perform the communication method provided in the first aspect.

According to a sixth aspect, an embodiment of this application provides a network device. The network device includes a processor, a memory, a transmitter, and a receiver, where the transmitter and the receiver are coupled to the processor, the processor controls a sending action of the transmitter, and the processor controls a receiving action of the receiver.

The memory is configured to store computer-executable program code. The program code includes information. When the processor executes the information, the information enables the network device to perform the communication method provided in the second aspect.

According to a seventh aspect, an embodiment of this application provides a chip, including: a processor, configured to invoke and run a computer program from a memory, to enable a device mounted with the chip to perform the communication method provided in the first aspect.

According to an eighth aspect, an embodiment of this application provides a chip, including: a processor, configured to invoke and run a computer program from a memory, to enable a device mounted with the chip to perform the communication method provided in the second aspect.

According to a ninth aspect, an embodiment of this application provides a computer-readable storage medium, configured to store a computer program, where the computer program enables a computer to perform the communication method provided in the first aspect.

According to a tenth aspect, an embodiment of this application provides a computer-readable storage medium, configured to store a computer program, where the computer program enables a computer to perform the communication method provided in the second aspect.

According to an eleventh aspect, an embodiment of this application provides a computer program product, including computer program information, where the computer program information enables a computer to perform the communication method provided in the first aspect.

According to a twelfth aspect, an embodiment of this application provides a computer program product, including computer program information, where the computer program information enables a computer to perform the communication method provided in the second aspect.

According to a thirteenth aspect, an embodiment of this application provides a computer program, where the computer program enables a computer to perform the communication method provided in the first aspect.

According to a fourteenth aspect, an embodiment of this application provides a computer program, where the computer program enables a computer to perform the communication method provided in the second aspect.

According to the communication method and apparatus provided in this application, the terminal device receives the first indication information from the network device, where the first indication information is used to indicate the first part of the HARQ process identifier scheduled by the network device. Then, the terminal device obtains the second part of the HARQ process identifier. Finally, the terminal device determines the HARQ process identifier based on the first part of the HARQ process identifier and the second part of the HARQ process identifier. Compared with the conventional technology, the HARQ process identifier is split into the first part and the second part for separate indication. In this way, the indication range of the HARQ process is extended without modifying the DCI format.

DESCRIPTION OF EMBODIMENTS

Figure 1:
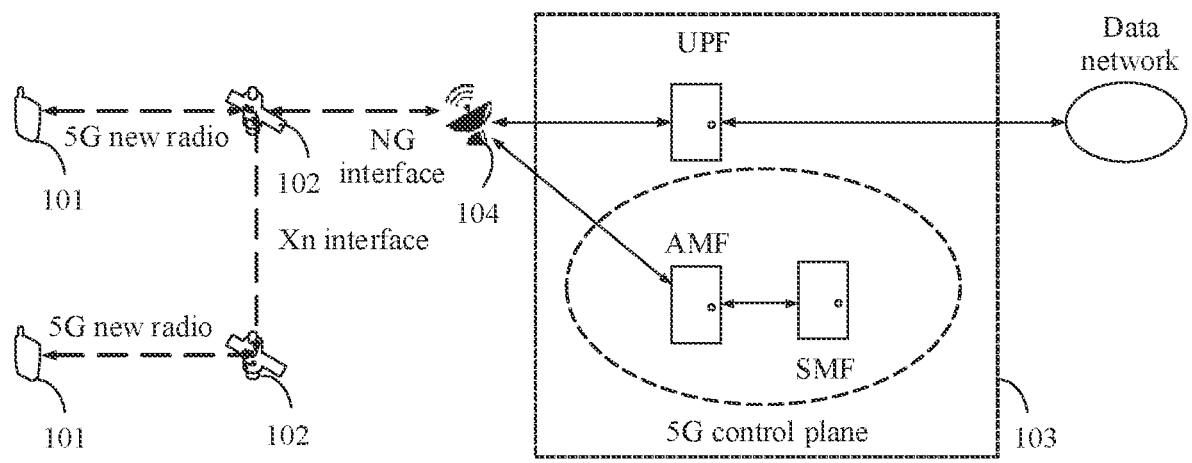
FIG. 1 is a schematic diagram of an application scenario of a communication method according to an embodiment of this application.

To make the objectives, technical solutions, and advantages of embodiments of the present invention clearer, the following clearly and completely describes the technical solutions in embodiments of the present invention with reference to the accompanying drawings in embodiments of the present invention. It is clear that the described embodiments are a part rather than all of embodiments of the present invention. Other embodiments obtained by a person of ordinary skill in the art based on embodiments of the present invention without creative efforts shall fall within the protection scope of the present invention.

The following first describes an HARQ technology.

The HARQ technology is a technology that combines forward error correction (FEC) and automatic repeat-request (ARQ). According to FEC, redundancy information is added, so that a terminal device can correct some errors, thereby reducing a quantity of retransmission times. For an error that cannot be corrected through FEC, the terminal device requests a network device to resend data based on an ARQ mechanism.

After receiving HARQ indication information, the terminal device may detect, by using error-detecting code, whether the received data has an error. If there is no error, the terminal device sends an acknowledge character (ACK) to the network device, and then the network device sends new data. If there is an error, the terminal device sends a negative acknowledge (NACK) character to the network device, and then the network device sends the same data.

To improve throughput, the network device initiates a plurality of HARQ processes in parallel. A quantity $N_{HARQ}$ of HARQ processes is specifically shown in formula (1):

$$N_{HARQ} = \left\lceil \frac{T_{sf} + T_{ue} + T_{ack} + T_{nb} + RTT}{T_{sf}} \right\rceil \quad (1)$$

RTT is a data round-trip time, $T_{sf}$ is a subframe length, $T_{ue}$ is a processing time of the terminal device, $T_{ack}$ is an ACK/NACK transmission time, and $T_{nb}$ is a processing time of the network device.

In different deployment scenarios, a requirement for the quantity of HARQ processes is usually different. Table 1 is a table of a correspondence between a deployment location and the quantity of HARQ processes during satellite communication.

TABLE 1

| Scenario/Parameter | | Low orbit | | | | | |
|---|---|---|---|---|---|---|---|
| | | 600 km | | 1200 km | | Synchronous orbit | |
| Scenario/Parameter | | Forwarding mode | Regeneration mode | Forwarding mode | Regeneration mode | Forwarding mode | Regeneration mode |
| Round-trip delay (ms) | | 20.89 | 12.89 | 41.77 | 25.77 | 541.46 | 270.73 |
| $N_{HARQ}$ | 15 KHz | 21 | 13 | 42 | 26 | 542 | 271 |
| | 30 KHz | 42 | 26 | 84 | 52 | 1083 | 542 |

TABLE 1-continued

| Scenario/Parameter | Low orbit | | | | Synchronous orbit | |
|---|---|---|---|---|---|---|
| | 600 km | | 1200 km | | | |
| | Forwarding mode | Regeneration mode | Forwarding mode | Regeneration mode | Forwarding mode | Regeneration mode |
| 60 KHz | 84 | 52 | 168 | 104 | 2166 | 1083 |
| 120 KHz | 168 | 104 | 335 | 207 | 4332 | 2166 |
| 240 KHz | 335 | 207 | 669 | 413 | 8664 | 4332 |

In an existing communication network, an HARQ process is usually indicated by a field HARQ process number in downlink control information (DCI). The field HARQ process number can include information of a maximum of four bits to separately indicate a process identifier of four bits in HARQ. Consequently, a maximum quantity of HARQ processes that can be supported in an existing standard is 16.

However, it can be learned from Table 1 that, in a satellite communication network, a quantity of HARQ processes that a network device needs to initiate to a terminal device in parallel is often greater than 16, and an indication range of an existing HARQ process is excessively small. If a bit used to indicate the quantity of HARQ processes in the DCI is simply added, a DCI format is modified. Consequently, a chain change of a control channel design may be caused, or valuable physical layer overheads may be increased.

To resolve the foregoing problem, this application proposes a communication method and apparatus, to extend an indication range of an HARQ process. A technical concept of this application is that an HARQ process identifier is split into a first part and a second part for separate indication. In this way, the indication range of the HARQ process is extended without modifying a DCI format.

The following describes an application scenario of this application.

FIG. 1 is a schematic diagram of an application scenario of a communication method according to an embodiment of this application. As shown in FIG. 1, a terminal device 101 accesses a network through a 5G new radio, and a base station 102 is deployed on a satellite and is connected to a ground core network device 103 by using a wireless link. In addition, a wireless link exists between satellites, to complete signaling interaction and user data transmission between the base stations 102. When the terminal device 101 communicates with the base station 102, the base station 102 may send indication information to the terminal device 101 to indicate an HARQ process identifier. The 5G new radio is a wireless link between the terminal device 101 and the base station 102.

In this embodiment of this application, quantities of terminal devices 101 and base stations 102 included in a communication system are not limited.

The terminal device 101 may also be referred to as a terminal, user equipment (UE), a mobile station (MS), a mobile terminal (MT), or the like. The terminal device 101 may be a mobile phone, a pad, a computer with a wireless transceiver function, a virtual reality (VR) terminal device, an augmented reality (AR) terminal device, a wireless terminal in industrial control, a wireless terminal in self driving, a wireless terminal in remote medical surgery, a wireless terminal in smart grid, a wireless terminal in smart home, or the like. The terminal device 101 provided in this embodiment of this application may be a mobile device that supports the 5G new radio, for example, a mobile phone or a pad. The terminal device 101 may access a satellite network through the air interface and initiate services such as call and Internet access.

The base station 102 is an access network device in a network device, may be configured to perform mutual conversion between a received air frame and an IP packet, and serves as a router between a wireless terminal and a remaining part of an access network, where the remaining part of the access network may include an Internet protocol (IP) network. The base station may coordinate attribute management of the air interface. A base station can be used to communicate with a mobile device. The base station may be a base transceiver station (BTS) in Global System for Mobile Communications (GSM) or Code Division Multiple Access (CDMA); or may be a NodeB (NB) in Wideband Code Division Multiple Access (WCDMA); or may be an evolved NodeB (Evolutional Node B, eNB or eNodeB) in Long Term Evolution (LTE), a relay station or an access point, a base station device in a future 5G network, or the like. The base station 102 provided in this embodiment of this application may be specifically a 5G base station, and mainly provides a wireless access service, schedules a wireless resource to an access terminal, and provides a reliable wireless transmission protocol, a data encryption protocol, and the like. Signaling interaction is implemented between the 5G base stations through an Xn interface. The 5G base station exchanges signaling, for example, a NAS of a core network, and service data of a user with the core network device 103 through an NG interface.

The core network device 103 is a network device, and is used for services such as user access control, mobility management, session management, user security authentication, and charging. The core network device 103 includes a plurality of functional units, which may be classified into control plane units and data plane functional entities. Specifically, the core network device 103 may include an access and mobility management unit (AMF), a user plane processing unit (UPF), and a session management unit (SMF). The AMF is responsible for user access management, security authentication, and mobility management. The UPF is responsible for functions such as user plane data transmission management, traffic statistics, and security eavesdropping. The SMF is responsible for session management.

In addition, optionally, the communication system in this embodiment of this application may further include a ground station 104, configured to forward signaling and service data between the base station 102 and the core network device 103.

It should be noted that the communication method in embodiments of this application may be applied to a plurality of communication systems. An applicable communication system is not limited in this embodiment of this application, and may be the satellite communication system shown in FIG. 1 or may be another communication system.

The following uses a terminal device and a network device as an example, to describe the technical solutions in embodiments of this application in detail with reference to specific embodiments. The following several specific embodiments may be combined with each other, and a same or similar concept or process may not be described repeatedly in some embodiments.

Figure 2:
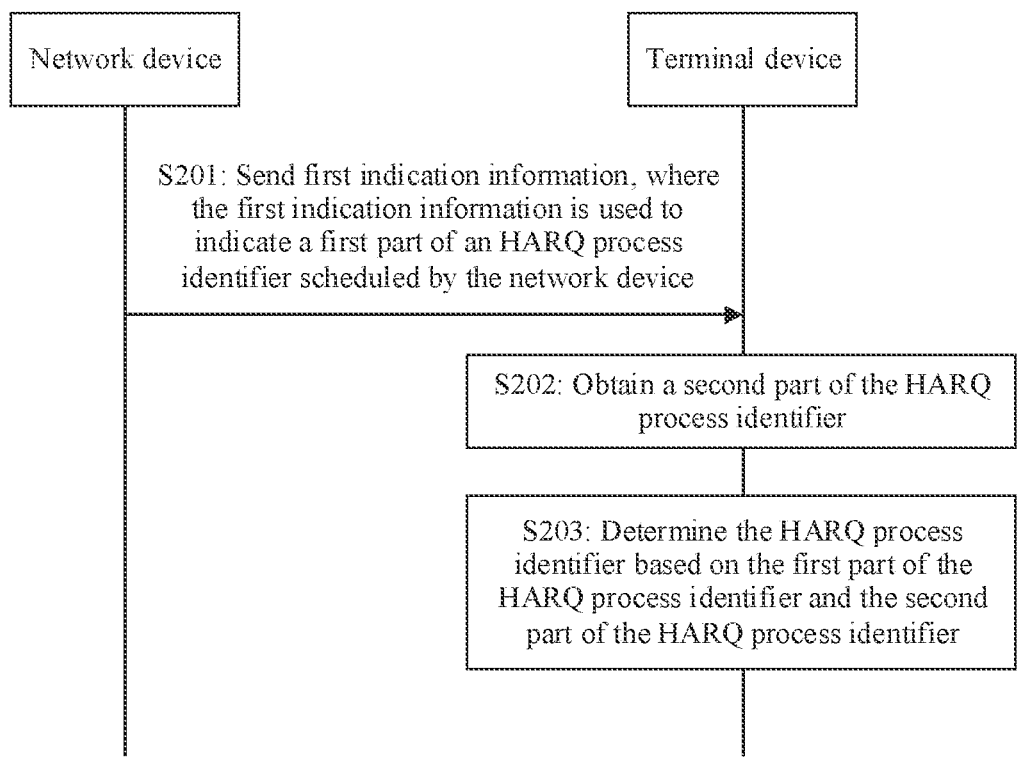
FIG. 2 is a signaling interaction diagram of a communication method according to an embodiment of this application.

FIG. 2 is a signaling interaction diagram of a communication method according to an embodiment of this application. This embodiment relates to a specific process of indicating an HARQ process identifier. As shown in FIG. 2, the method includes the following steps.

S201: A network device sends first indication information to a terminal device, where the first indication information is used to indicate a first part of an HARQ process identifier scheduled by the network device.

In this step, after determining a to-be-scheduled HARQ process, the network device may send the first indication information to the terminal device.

The HARQ process identifier includes bitmap information. In the conventional technology, bitmap information of an HARQ process identifier is fixed to four bits. In this application, the bitmap information of the HARQ process identifier is greater than four bits. For example, the bitmap information of the HARQ process identifier in this application may be six bits, and correspondingly, a maximum HARQ process is 64. For example, the bitmap information of the HARQ process identifier in this application may be eight bits, and correspondingly, a maximum HARQ process is 256.

In some embodiments, the first indication information used to indicate the first part of the HARQ process identifier is carried in DCI. For example, the first indication information may be carried in a field HARQ process number of the DCI. The field HARQ process number of the DCI may indicate information of a maximum of four bits. Correspondingly, the first part of the HARQ process identifier includes bitmap information of a maximum of four bits.

For example, the first indication information may be carried in a field Bandwidth part indicator of the DCI. The field Bandwidth part indicator has bitmap information of two bits. Correspondingly, the first part of the HARQ process identifier includes bitmap information of a maximum of two bits.

In some other embodiments, the first indication information used to indicate the first part of the HARQ process identifier is carried in an uplink message of a bandwidth part (BWP) or a downlink message of a BWP. For example, a field HARQ-GROUP-Index may be added to the uplink message of the BWP or the downlink message of the BWP, to indicate the first part of the HARQ process identifier.

It should be noted that bits that may be included in the first part of the HARQ process identifier are not limited in this embodiment of this application, and may be specifically set based on an actual situation.

In addition, a location of the first part of the HARQ process identifier in the bitmap information is not limited in this embodiment of this application. For example, if the bitmap information of the HARQ process identifier is six bits, and the first part of the HARQ process identifier includes four bits, the first part of the HARQ process identifier may be the first four bits in the bitmap information of the HARQ process identifier, or may be the last four bits in the bitmap information of the HARQ process identifier.

S202: The terminal device obtains a second part of the HARQ process identifier.

In this step, after receiving the first indication information sent by the network device to determine the first part of the HARQ process identifier scheduled by the network device, the terminal device may obtain the second part of the HARQ process identifier.

The second part of the HARQ process identifier includes bitmap information of bits other than the first part of the HARQ process identifier in the HARQ process identifier. For example, the bitmap information of the HARQ process identifier is six bits. If the first part of the HARQ process identifier may be the first four bits in the bitmap information of the HARQ process identifier, the second part of the HARQ process identifier may be the last two bits in the bitmap information of the HARQ process identifier.

How to obtain the second part of the HARQ process identifier is not limited in this embodiment of this application. The following provides three optional manners to obtain the second part of the HARQ process identifier.

In a first manner, the terminal device may obtain a demodulation reference signal DMRS of a physical downlink control channel PDCCH, and determine the second part of the HARQ process identifier based on an initial value of the DMRS. In a second manner, the terminal device may first determine a target BWP of the terminal device based on a mapping relationship between the first part of the HARQ process identifier and the BWP. Then, the terminal device may obtain the second part of the HARQ process identifier on the target BWP. In a third manner, the terminal device may obtain time domain information corresponding to the first indication information, and determine the second part of the HARQ process identifier based on the time domain information and a mapping relationship between the time domain information and the second part of the HARQ process identifier.

It should be noted that, in this embodiment of this application, the second part of the HARQ process identifier may be determined in one of the foregoing optional manners or by using a combination of the first manner and the third manner. This is not limited in this application.

For example, if the second part of the HARQ process identifier includes bitmap information of two bits, the second part of the HARQ process identifier may be determined by using the DMRS of the PDCCH in only the first manner. If the second part of the HARQ process identifier includes bitmap information of four bits, bitmap information of the first two bits in the second part of the HARQ process identifier may be determined by using the DMRS of the PDCCH in the first manner, bitmap information of the last two bits in the second part of the HARQ process identifier is determined by using the time domain information in the third manner, and the bitmap information of the first two bits and the bitmap information of the last two bits are combined to form the second part of the HARQ process identifier.

S203: The terminal device determines the HARQ process identifier based on the first part of the HARQ process identifier and the second part of the HARQ process identifier.

In this step, after obtaining the first part of the HARQ process identifier and the second part of the HARQ process identifier, the terminal device may combine the first part of the HARQ process identifier and the second part of the HARQ process identifier to form a complete HARQ process identifier.

For example, if the bitmap information of the HARQ process identifier is six bits, the first part of the HARQ process identifier may be the first four bits in the bitmap information of the HARQ process identifier, specifically, 1001. The second part of the HARQ process identifier may be the last two bits in the bitmap information of the HARQ process identifier, specifically, 10. Correspondingly, the first part of the HARQ process identifier and the second part of the HARQ process identifier may be combined to form the complete HARQ process identifier 100110. Then, the HARQ process identifier may be converted into a decimal number, and it is determined that the network device schedules a $38^{th}$ HARQ process.

According to the communication method provided in this application, the terminal device receives the first indication information from the network device, where the first indication information is used to indicate the first part of the HARQ process identifier scheduled by the network device. Then, the terminal device obtains the second part of the HARQ process identifier. Finally, the terminal device determines the HARQ process identifier based on the first part of the HARQ process identifier and the second part of the HARQ process identifier. Compared with the conventional technology, the HARQ process identifier is split into the first part and the second part for separate indication. In this way, an indication range of the HARQ process is extended without modifying a DCI format.

Figure 3:
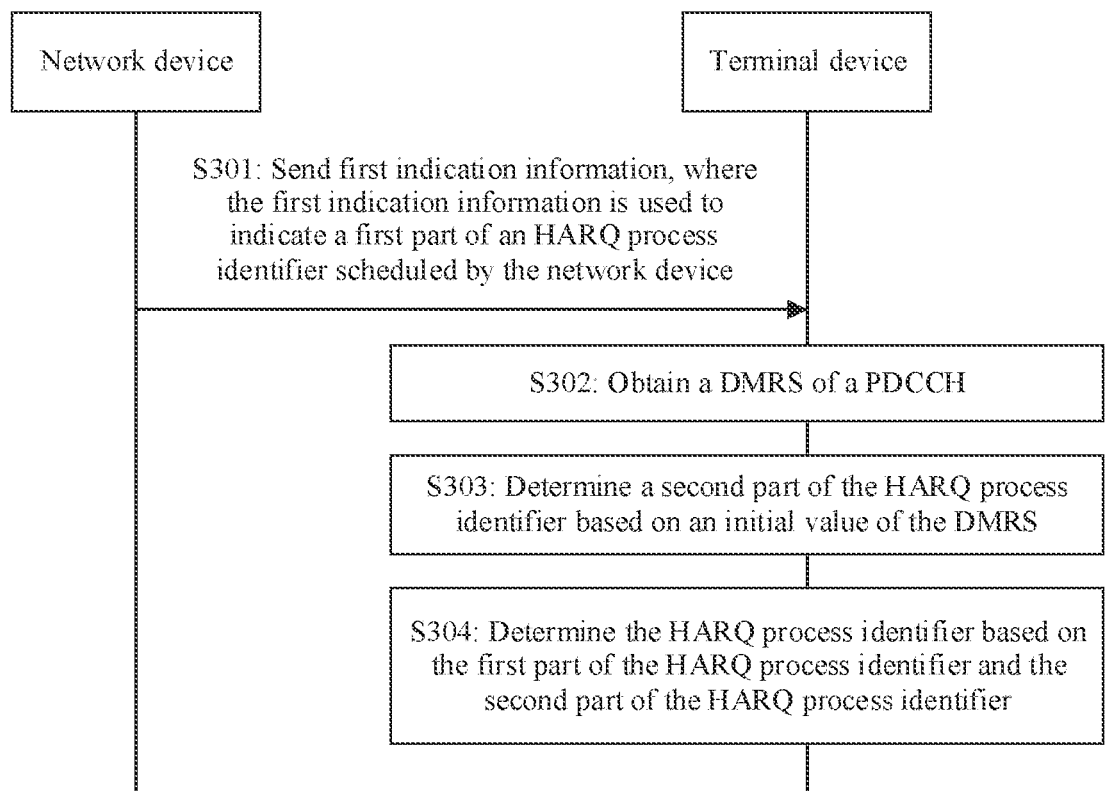
FIG. 3 is a signaling interaction diagram of another communication method according to an embodiment of this application.

Based on the foregoing embodiment, the following describes the first manner of obtaining the second part of the HARQ process identifier. FIG. 3 is a signaling interaction diagram of another communication method according to an embodiment of this application. As shown in FIG. 3, the method includes the following steps.

S301: A network device sends first indication information to a terminal device, where the first indication information is used to indicate a first part of an HARQ process identifier scheduled by the network device.

In this embodiment, a specific implementation process and an implementation principle of the step S301 are similar to those of the step S201 in FIG. 2. Details are not described herein again.

S302: The terminal device obtains a demodulation reference signal (DMRS) of a physical downlink control channel (PDCCH).

In this step, after receiving the first indication information sent by the network device to determine the first part of the HARQ process identifier, the terminal device may obtain the DMRS of the PDCCH to determine a second part of the HARQ process identifier.

How to obtain the DMRS of the PDCCH is not limited in this embodiment of this application, and the DMRS of the PDCCH may be obtained in an existing manner.

S303: The terminal device determines the second part of the HARQ process identifier based on an initial value of the DMRS.

In this step, when obtaining the DMRS of the PDCCH, the terminal device may determine the second part of the HARQ process identifier based on the initial value of the DMRS.

In some embodiments, the second part of the HARQ process identifier may be used as an initial parameter to generate the DMRS of the PDCCH. Correspondingly, the initial value of the DMRS is related to the second part of the HARQ process identifier.

For example, a sequence r (m) of the DMRS of the PDCCH may be shown in formula (2):

$$r(m) = \frac{1}{\sqrt{2}}(1 - 2 \cdot c(2m)) + j\frac{1}{\sqrt{2}}(1 - 2 \cdot c(2m + 1)) \quad (2)$$

c(n) is a pseudo-random sequence, and a specific definition may be shown in formulas (3) to (5):

$$c(n) = (x_1(n+N_c) + x_2(n+N_c)) \bmod 2 \quad (3)$$

$$x_1(n+31) = (x_1(n+3) + x_1(n)) \bmod 2 \quad (4)$$

$$x_2(n+31) = (x_2(n+3) + x_2(n+2) + x_2(n+1) + x_2(n)) \bmod 2 \quad (5)$$

Nc=1600, $x_1(n)$ is an m sequence and is initialized to $x_1(0)=1$, $x_1(n)=0$, n=1, 2, ..., 30, and $x_2(n)$ is an m sequence and is initialized to $$c_{init} = \sum_{i=0}^{30} x_2(i) \cdot 2^i.$$

A value of cinit is related to the second part of the HARQ process identifier, and may be shown in formula (6):

$$\text{cinit} = \text{function}(\text{HARQ\_IDMSB\_2\_BITS}, \text{parameter1}, \text{parameter2} \ldots ) \quad (6)$$

HARQ_IDMSB_2_BITS is the second part of the HARQ process identifier, and parameter1, parameter2, and the like are parameters not related to the second part of the HARQ process identifier.

S304: The terminal device determines the HARQ process identifier based on the first part of the HARQ process identifier and the second part of the HARQ process identifier.

In this embodiment, a specific implementation process and an implementation principle of the step S304 are similar to those of the step S203 in FIG. 2. Details are not described herein again.

According to the communication method provided in this embodiment of this application, the network device first sends the first indication information to the terminal device, where the first indication information is used to indicate the first part of the HARQ process identifier scheduled by the network device. Then, the terminal device obtains the demodulation reference signal DMRS of the physical downlink control channel PDCCH. Then, the terminal device determines the second part of the HARQ process identifier based on the initial value of the DMRS. Finally, the terminal device determines the HARQ process identifier based on the first part of the HARQ process identifier and the second part of the HARQ process identifier. In this manner, some bits of the HARQ process identifier may be implicitly carried in the demodulation reference signal of the PDCCH, thereby extending an indication range of the HARQ process identifier.

Figure 4:
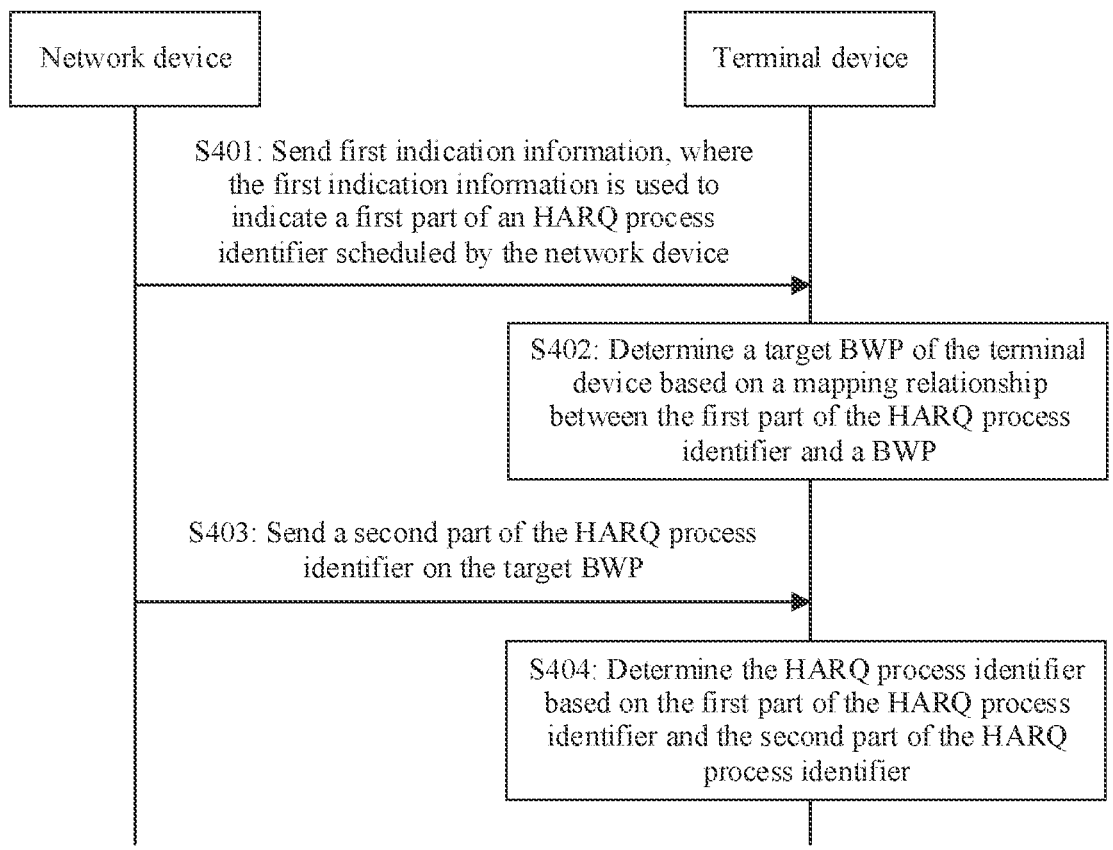
FIG. 4 is a signaling interaction diagram of yet another communication method according to an embodiment of this application.

Based on the foregoing embodiment, the following describes the second manner of obtaining the second part of the HARQ process identifier. FIG. 4 is a signaling interaction diagram of yet another communication method according to an embodiment of this application. As shown in FIG. 4, the method includes the following steps.

S401: A network device sends first indication information to a terminal device, where the first indication information is used to indicate a first part of an HARQ process identifier scheduled by the network device.

In this embodiment, a specific implementation process and an implementation principle of the step S401 are similar to those of the step S201 in FIG. 2. Details are not described herein again.

S402: The terminal device determines a target BWP of the terminal device based on a mapping relationship between the first part of the HARQ process identifier and a BWP.

In this step, after the terminal device receives the first indication information, if the first indication information is carried in a field Bandwidth part indicator of DCI, or is carried in a field HARQ-GROUP-Index of an uplink message of the BWP or a downlink message of the BWP, the terminal device may determine the target BWP of the terminal device based on the mapping relationship between the first part of the HARQ process identifier and the BWP.

The mapping relationship between the first part of the HARQ process identifier and the BWP is configured by using radio resource control (RRC) signaling.

For example, four BWPs are allocated for uplink/downlink of the terminal device, and correspondingly, the mapping relationship between the first part of the HARQ process identifier and the BWP is shown in Table 2.

TABLE 2

| Value of an indication field Two bits | BWP |
|---|---|
| 00 | Target BWP-ID = 1 |
| 01 | Target BWP-ID = 2 |
| 10 | Target BWP-ID = 3 |
| 11 | Target BWP-ID = 3 |

S403: The network device sends a second part of the HARQ process identifier to the terminal device on the target BWP.

In this step, after the terminal device determines the target BWP, the terminal device may be switched to the target BWP, to receive the second part of the HARQ process identifier that is sent by the network device on the target BWP, to determine the HARQ process identifier.

Correspondingly, HARQ process identifier ranges that may be determined on different BWPs are different. For example, the first part of the HARQ process identifier includes bitmap information of two bits, and the second part of the HARQ process identifier includes bitmap information of four bits. BWPs and indicatable ranges of the HARQ process identifier are shown in Table 3.

TABLE 3

| BWP ID | HARQ ID |
|---|---|
| 1 | 0 to 15 |
| 2 | 16 to 31 |
| 3 | 32 to 47 |
| 4 | 48 to 63 |

In some embodiments, the second part of the HARQ process identifier may be similar to that in the conventional technology, and is sent to the terminal device by using the DCI. In this embodiment, the second part of the HARQ process identifier may include bitmap information of a maximum of four bits, to be combined with the first part of the HARQ process identifier, thereby extending an indication range of the HARQ process identifier.

S404: The terminal device determines the HARQ process identifier based on the first part of the HARQ process identifier and the second part of the HARQ process identifier.

In this embodiment, a specific implementation process and an implementation principle of the step S404 are similar to those of the step S203 in FIG. 2. Details are not described herein again.

According to the communication method provided in this embodiment of this application, the network device first sends the first indication information to the terminal device, where the first indication information is used to indicate the first part of the HARQ process identifier scheduled by the network device. Then, the terminal device determines the target BWP of the terminal device based on the mapping relationship between the first part of the HARQ process identifier and the BWP. Then, the network device sends the second part of the HARQ process identifier to the terminal device on the target BWP. Finally, the terminal device determines the HARQ process identifier based on the first part of the HARQ process identifier and the second part of the HARQ process identifier. In this manner, a mapping relationship between the BWP and an HARQ process may be established, thereby extending the indication range of the HARQ process identifier.

Figure 5:
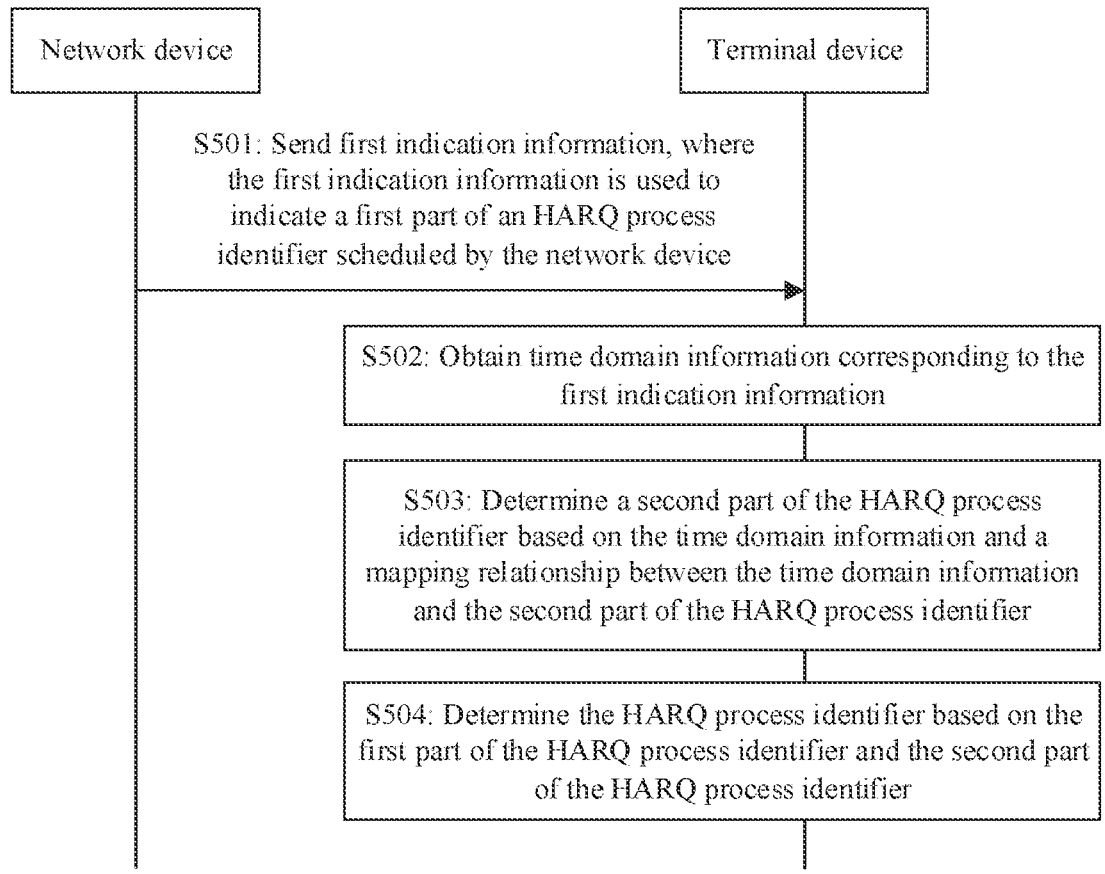
FIG. 5 is a signaling interaction diagram of still another communication method according to an embodiment of this application.

Based on the foregoing embodiment, the following describes the third manner of obtaining the second part of the HARQ process identifier. FIG. 5 is a signaling interaction diagram of still another communication method according to an embodiment of this application. As shown in FIG. 5, the method includes the following steps.

S501: A network device sends first indication information to a terminal device, where the first indication information is used to indicate a first part of an HARQ process identifier scheduled by the network device.

In this embodiment, a specific implementation process and an implementation principle of the step S401 are similar to those of the step S201 in FIG. 2. Details are not described herein again.

S502: The terminal device obtains time domain information corresponding to the first indication information.

In this step, after receiving the first indication information to determine the first part of the HARQ process identifier, the terminal device may obtain the time domain information corresponding to the first indication information.

In some embodiments, the time domain information is a slot index in a radio frame corresponding to the first indication information.

S503: The terminal device determines a second part of the HARQ process identifier based on the time domain information and a mapping relationship between the time domain information and the second part of the HARQ process identifier.

In this step, after obtaining the time domain information corresponding to the first indication information, the terminal device may determine the second part of the HARQ process identifier based on the time domain information and the mapping relationship between the time domain information and the second part of the HARQ process identifier.

For example, the terminal device may establish the mapping relationship between the time domain information and the second part of the HARQ process identifier based on a preset indication of the network device. In a subsequent communication process, if the terminal device receives the first indication information, the terminal device tries to obtain the slot index (slot_index) in the radio frame, and determines, by using the mapping relationship between time domain information and the second part of the HARQ process identifier, the second part that is of the HARQ process identifier and that corresponds to the slot index.

S504: The terminal device determines the HARQ process identifier based on the first part of the HARQ process identifier and the second part of the HARQ process identifier.

In this embodiment, a specific implementation process and an implementation principle of the step S504 are similar to those of the step S203 in FIG. 2. Details are not described herein again.

According to the communication method provided in this embodiment of this application, the network device first sends the first indication information to the terminal device, where the first indication information is used to indicate the first part of the HARQ process identifier scheduled by the network device. Then, the terminal device obtains the time domain information corresponding to the first indication information. Then, the terminal device determines the second part of the HARQ process identifier based on the time domain information and the mapping relationship between the time domain information and the second part of the HARQ process identifier. Finally, the terminal device determines the HARQ process identifier based on the first part of the HARQ process identifier and the second part of the HARQ process identifier. In this manner, a related bit of the HARQ process identifier may be implicitly carried in the time domain information, thereby extending an indication range of the HARQ process identifier.

A person of ordinary skill in the art may understand that all or a part of the steps of the method embodiments may be implemented by a program instructing relevant hardware.

The program may be stored in a computer-readable storage medium. When the program runs, the steps of the method embodiments are performed. The foregoing storage medium includes any medium that can store program code, such as a ROM, a RAM, a magnetic disk, or an optical disc.

Figure 6:
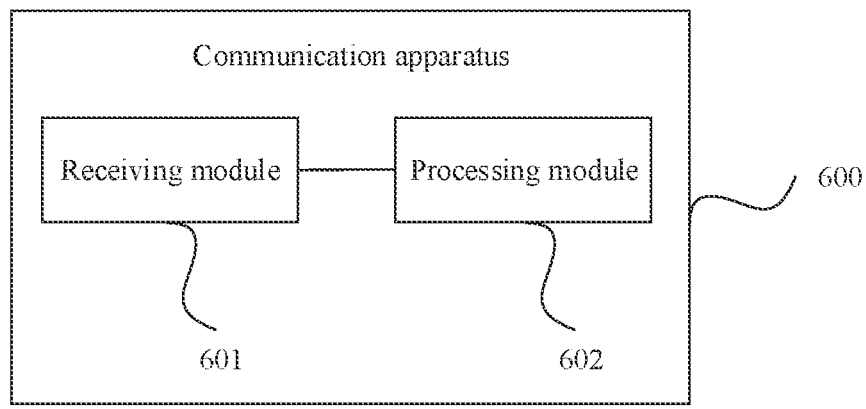
FIG. 6 is a schematic diagram of a structure of a communication apparatus according to an embodiment of this application.

FIG. 6 is a schematic diagram of a structure of a communication apparatus according to an embodiment of this application. The communication apparatus may be implemented by using software, hardware, or a combination thereof, and may be the terminal device or a chip in the terminal device described above, to perform the communication method on the terminal device side. As shown in FIG. 6, the communication apparatus 600 includes a receiving module 601 and a processing module 602.

The receiving module 601 is configured to receive first indication information from a network device, where the first indication information is used to indicate a first part of an HARQ process identifier scheduled by the network device.

The processing module 602 is configured to: obtain a second part of the HARQ process identifier; and determine the HARQ process identifier based on the first part of the HARQ process identifier and the second part of the HARQ process identifier.

In an optional implementation, the first indication information is carried in downlink control information DCI, an uplink message of a bandwidth part BWP, or a downlink message of a BWP.

In an optional implementation, the processing module 602 is specifically configured to: obtain a demodulation reference signal DMRS of a physical downlink control channel PDCCH; and determine the second part of the HARQ process identifier based on an initial value of the DMRS.

In an optional implementation, the processing module 602 is specifically configured to: determine a target BWP of a terminal device based on a mapping relationship between the first part of the HARQ process identifier and the BWP; and obtain the second part of the HARQ process identifier on the target BWP.

In an optional implementation, the mapping relationship between the first part of the HARQ process identifier and the BWP is configured by using radio resource control RRC signaling.

In an optional implementation, the processing module 602 is specifically configured to: obtain time domain information corresponding to the first indication information; and determine the second part of the HARQ process identifier based on the time domain information and a mapping relationship between the time domain information and the second part of the HARQ process identifier.

In an optional implementation, the time domain information is a slot index in a radio frame corresponding to the first indication information.

In an optional implementation, the HARQ process identifier includes bitmap information.

In an optional implementation, the bitmap information is greater than four bits.

The communication apparatus provided in this embodiment of this application may perform the actions of the communication method on the terminal device side in the foregoing method embodiment, and implementation principles and technical effects thereof are similar. Details are not described herein again.

Figure 7:
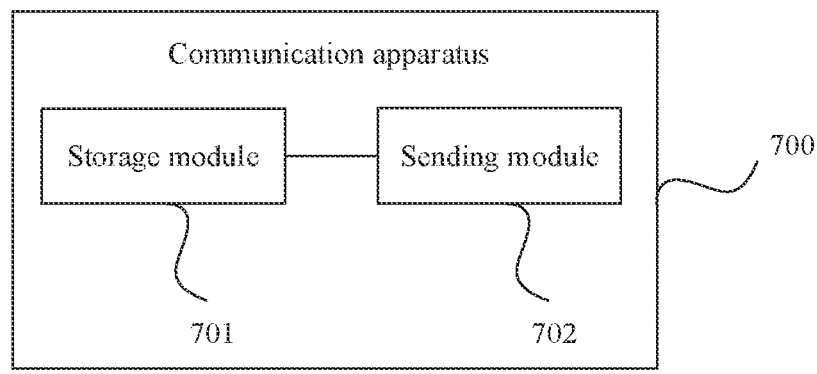
FIG. 7 is a schematic diagram of a structure of another communication apparatus according to an embodiment of this application.

FIG. 7 is a schematic diagram of a structure of another communication apparatus according to an embodiment of this application. The communication apparatus may be implemented by using software, hardware, or a combination thereof, and may be the network device or a chip in the network device described above, to perform the communication method on the network device side. As shown in FIG. 7, the communication apparatus 700 includes a storage module 701 and a sending module 702.

The storage module 701 is configured to store an executable program.

The sending module 702 is configured to send first indication information to a terminal device, where the first indication information is used to indicate a first part of an HARQ process identifier scheduled by a network device, and the first part of the HARQ process identifier is used to cooperate with a second part of the HARQ process identifier to determine the HARQ process identifier.

In an optional implementation, the first indication information is carried in downlink control information DCI, an uplink message of a bandwidth part BWP, or a downlink message of a BWP.

In an optional implementation, the sending module 702 is further configured to send the second part of the HARQ process identifier to the terminal device on a target BWP.

In an optional implementation, the HARQ process identifier includes bitmap information.

In an optional implementation, the bitmap information is greater than four bits.

The communication apparatus provided in this embodiment of this application may perform the actions of the communication method on the network device side in the foregoing method embodiment, and implementation principles and technical effects thereof are similar. Details are not described herein again.

Figure 8:
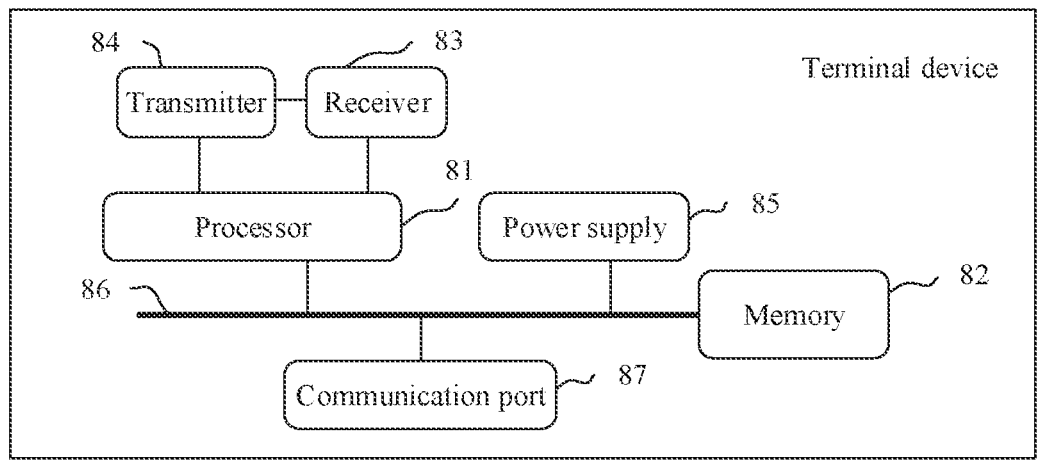
FIG. 8 is a schematic diagram of a structure of a terminal device according to an embodiment of this application.

FIG. 8 is a schematic diagram of a structure of a terminal device according to an embodiment of this application. As shown in FIG. 8, the terminal device may include a processor 81 (for example, a CPU), a memory 82, a receiver 83, and a transmitter 84. The receiver 83 and the transmitter 84 are coupled to the processor 81, the processor 81 controls a receiving action of the receiver 83, and the processor 81 controls a sending action of the transmitter 84. The memory 82 may include a high-speed RAM memory or a non-volatile memory NVM, for example, at least one disk memory. The memory 82 may store various types of information, to complete various processing functions and implement the method steps in embodiments of this application. Optionally, the terminal device in this embodiment of this application may further include: a power supply 85, a communication bus 86, and a communication port 87. The receiver 83 and the transmitter 84 may be integrated into a transceiver of the terminal device, or may be independent transceiver antennas on the terminal device. The communication bus 86 is configured to implement a communication connection between elements. The communication port 87 is configured to implement connection and communication between the terminal device and another peripheral device.

In this embodiment of this application, the memory 82 is configured to store computer-executable program code. The program code includes information. When the processor 81 executes the information, the information enables the processor 81 to perform the processing actions of the terminal device in the foregoing method embodiment, enables the transmitter 84 to perform the sending actions of the terminal device in the foregoing method embodiment, and enables the receiver 83 to perform the receiving actions of the terminal device in the foregoing method embodiment. Implementation principles and technical effects thereof are similar. Details are not described herein again.

Figure 9:
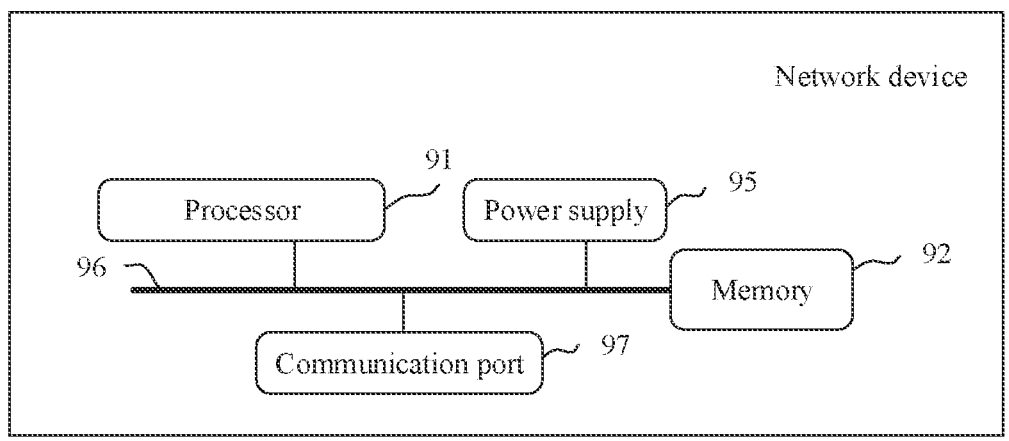
FIG. 9 is a schematic diagram of a structure of a network device according to an embodiment of this application.

FIG. 9 is a schematic diagram of a structure of a network device according to an embodiment of this application. As shown in FIG. 9, the network device may include a processor 91 (for example, a CPU) and a memory 92. The memory 92 may include a high-speed RAM memory or a non-volatile memory NVM, for example, at least one disk memory. The memory 92 may store various types of information, to complete various processing functions and implement the method steps in embodiments of this application. Optionally, the network device in this embodiment of this application may further include: a power supply 95, a communication bus 96, and a communication port 97. The communication bus 96 is configured to implement a communication connection between elements. The communication port 97 is configured to implement connection and communication between the network device and another peripheral device.

In this embodiment of this application, the memory 92 is configured to store computer-executable program code. The program code includes information. When the processor 91 executes the information, the information enables the processor 91 to perform the processing actions of the network device in the foregoing method embodiment. Implementation principles and technical effects thereof are similar. Details are not described herein again.

An embodiment of this application further provides a communication system, including a terminal device and a network device, where the terminal device performs the foregoing communication method on the terminal device side, and the network device performs the foregoing communication method on the network device side.

An embodiment of this application further provides a chip, including a processor and an interface. The interface is configured to input/output data or instructions processed by the processor. The processor is configured to perform the method provided in the foregoing method embodiment. The chip may be used in the terminal device or the network device.

The present invention further provides a computer-readable storage medium. The computer-readable storage medium may include any medium that can store program code, for example, a USB flash drive, a removable hard disk, a read-only memory (ROM), a random access memory (RAM), a magnetic disk, or an optical disc. Specifically, the computer-readable storage medium stores program information. The program information is applied to the foregoing communication method on the terminal device side, or is applied to the foregoing communication method on the network device side.

An embodiment of this application further provides a program. When the program is executed by a processor, the communication method on the terminal device side or the communication method on the network device side that is provided in the foregoing method embodiment is performed.

An embodiment of this application further provides a program product, for example, a computer-readable storage medium. The program product stores instructions. When the instructions are run on a computer, the computer is enabled to perform the communication method on the terminal device side or the communication method on the network device side that is provided in the foregoing method embodiment.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The available medium may be a magnetic medium (for example, a floppy disk, a hard disk, or a magnetic tape), an optical medium (for example, a DVD), a semiconductor medium (for example, a solid-state drive Solid-State Drive (SSD)), or the like.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of the present invention.

What is claimed is:

1. A communication method performed by a terminal device, comprising:
   receiving first indication information from a network device, wherein the first indication information indicates a first part of a Hybrid Automatic Repeat reQuest (HARQ) process identifier scheduled by the network device;
   obtaining a second part of the HARQ process identifier on a target bandwidth part (BWP) of the terminal device, wherein the target BWP is determined based on a mapping relationship between the first part of the HARQ process identifier and a BWP; and
   determining the HARQ process identifier based on the first part of the HARQ process identifier and the second part of the HARQ process identifier.

2. The method according to claim 1, wherein the first indication information is carried in at least one of downlink control information (DCI), an uplink message of a BWP, or a downlink message of a BWP.

3. The method according to claim 1, wherein the obtaining a second part of the HARQ process identifier comprises:
   obtaining a demodulation reference signal (DMRS) of a physical downlink control channel (PDCCH); and
   determining the second part of the HARQ process identifier based on an initial value of the DMRS.

4. The method according to claim 1, wherein the mapping relationship between the BWP and the second part of the HARQ process identifier is configured by using radio resource control (RRC) signaling.

5. The method according to claim 1, wherein the obtaining a second part of the HARQ process identifier comprises:
   obtaining time domain information corresponding to the first indication information; and
   determining the second part of the HARQ process identifier based on the time domain information and a mapping relationship between the time domain information and the second part of the HARQ process identifier.

6. The method according to claim 5, wherein the time domain information is a slot index in a radio frame corresponding to the first indication information.

7. The method according to claim 1, wherein the HARQ process identifier comprises bitmap information.

8. The method according to claim 7, wherein the bitmap information is greater than four bits.

9. A communication method, comprising:
sending first indication information to a terminal device, wherein the first indication information indicates a first part of a Hybrid Automatic Repeat reQuest (HARQ) process identifier scheduled by a network device, and the first part of the HARQ process identifier cooperates with a second part of the HARQ process identifier to determine the HARQ process identifier; and sending the second part of the HARQ process identifier to the terminal device on a target BWP, wherein the target BWP is determined based on a mapping relationship between the first part of the HARQ process identifier and a BWP.

10. The method according to claim 9, wherein the first indication information is carried in at least one of downlink control information (DCI), an uplink message of a BWP, or a downlink message of a BWP.

11. The method according to claim 9, wherein the HARQ process identifier comprises bitmap information.

12. The method according to claim 11, wherein the bitmap information is greater than four bits.

13. A communication apparatus, comprising:
at least one processor; and
one or more memories coupled to the at least one processor and storing programming instructions for execution by the at least one processor to:
receive first indication information from a network device, wherein the first indication information indicates a first part of a Hybrid Automatic Repeat request (HARQ) process identifier scheduled by the network device;
obtain a second part of the HARQ process identifier on a target bandwidth part (BWP) of the communications apparatus, wherein the target BWP is determined based on a mapping relationship between the first part of the HARQ process identifier and a BWP; and
determine the HARQ process identifier based on the first part of the HARQ process identifier and the second part of the HARQ process identifier.

14. The apparatus according to claim 13, wherein the first indication information is carried in at least one of downlink control information (DCI), an uplink message of a BWP, or a downlink message of a BWP.

15. The apparatus according to claim 13, wherein the programming instructions are for execution by the at least one processor to:
obtain a demodulation reference signal (DMRS) of a physical downlink control channel (PDCCH); and
determine the second part of the HARQ process identifier based on an initial value of the DMRS.

16. The apparatus according to claim 13, wherein the mapping relationship between the BWP and the second part of the HARQ process identifier is configured by using radio resource control (RRC) signaling.

17. The apparatus according to claim 13, wherein the programming instructions are for execution by the at least one processor to:
obtain time domain information corresponding to the first indication information; and
determine the second part of the HARQ process identifier based on the time domain information and a mapping relationship between the time domain information and the second part of the HARQ process identifier.

* * * * *